Figures 1, 2:
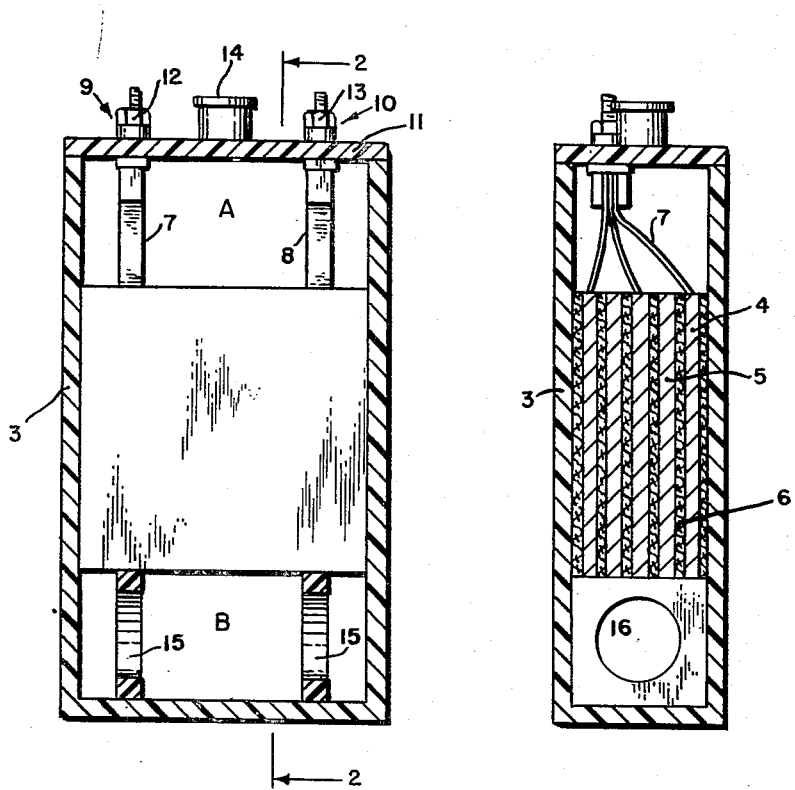

July 27, 1954     P. J. RAPPAPORT     2,684,990

BATTERY DESIGN FOR GUIDED MISSILES

Filed Feb. 16, 1953

*INVENTOR.*
PAUL J. RAPPAPORT
BY
*Harry M. Saragovitz*
*Attorney*

Patented July 27, 1954

2,684,990

UNITED STATES PATENT OFFICE 2,684,990

BATTERY DESIGN FOR GUIDED MISSILES

Paul J. Rappaport, Long Branch, N. J., assignor to the United States of America as represented by the Secretary of the Army Application February 16, 1953, Serial No. 337,256

3 Claims. (Cl. 136—166)

(Granted under Title 35, U. S. Code (1952), sec. 266)

The invention described herein may be manufactured and used by or for the Government for governmental purposes without the payment of any royalty thereon.

This invention relates to battery structures for guided missiles.

In guided missiles a certain type of so-called one-shot battery is used which in some respects may be considered also as a rechargeable or secondary battery.

Some guided missile batteries are of the non-reserve type, that is, batteries that are in an activated condition at all times. Such batteries do not hold their charge indefinitely without being periodically recharged or kept under a so-called trickle charge.

Batteries for guided missiles must be of extreme light weight and small dimensions. Therefore, only thin, flat plates or electrodes and a minimum amount of electrolyte are used, the thin, flat plates being very close to each other. During the charge of such small batteries, the gas developed will displace and raise the electrolyte within the narrow space between the plates and therefore it is necessary to have a relatively large space above the upper edges of the electrodes. It has been ascertained empirically that the height of the space above the electrodes should be about 20 to 40 per cent of the height of the electrodes.

Under the high acceleration to which the batteries are exposed in the guided missiles, the small amount of electrolyte may be forced up into the space above the plates leaving the plates free of electrolyte. Whatever portion of the plate is free of or uncovered by the electrolyte will not be active and the capacity of such battery will, of course, be decreased.

It is an object of this invention to design a battery structure that overcomes these shortcomings by providing a space below the plates equal in volume to the space above the plates. Such a design insures that, if the battery is filled with electrolyte to the tops of the plate electrodes, these plate electrodes will be under any direction of acceleration completely covered with the electrolyte and the battery will not suffer any decrease of capacity.

The invention will be more fully described by reference to the embodiment shown in the accompanying drawing, in which Fig. 1 shows a vertical sectional view of a battery structure according to the invention and Fig. 2 a sectional view taken along the line 2—2 of Fig. 1.

In the drawing, 3 represents the walls of the plastic cell container within which are located the elements of the battery consisting of positive plates 4 and negative plates 5. The adjacent positive and negative plates are separated by the usual separators 6. The plates or electrodes are provided with positive and negative conducting straps 7, 8, respectively which are connected with suitable terminal posts 9 and 10. These terminals pass thru openings in the plastic cover 11 to which cover they are tightly connected by seal nuts 12 and 13. The cover 11 also carries a vent plug 14. The plates or electrodes are secured in their position by supporting elements 15 which are provided with holes 16 to allow free flow of the electrolyte.

The battery is dimensioned in such a way that the height of the space A above the plates is about 20 to 40 per cent of the height of the electrodes whereas the space B below the electrodes possesses the same volume as the space A.

The battery according to the invention is filled with electrolyte in the usual manner to the tops of the plates or electrodes. The volume of the electrolyte in B, that is, below the plates will now be the same as the volume of the free space A above the plates. This specific structure insures that under any direction of acceleration the plates are completely covered with electrolyte causing the battery to deliver equal capacity under any discharge conditions.

The invention is not limited to the above described embodiment and various modifications are conceivable within the scope of the inventive idea as defined in the appended claims.

What is claimed is:

1. Battery structure for guided missiles of the non-reserve, one-shot type to be kept under a trickle charge in which the height of the space above the electrodes is about 20 to 40 per cent of the height of the electrodes characterized in that a space is provided below the lower edges of the electrodes said lower space being identical in volume with the volume of the space above the plates.

2. Battery structure according to claim 1 in which the electrodes are secured in their position by elements supporting the lower edges of the electrodes said elements having holes to allow free flow of the electrolyte under all conditions of acceleration.

3. Battery structure according to claim 1 in which the electrodes are covered with liquid electrolyte under all conditions of acceleration.

References Cited in the file of this patent

UNITED STATES PATENTS

| Number | Name | Date |
|---|---|---|
| 1,154,372 | Burritt | Sept. 21, 1915 |
| 1,556,932 | Harris | Oct. 13, 1925 |
| 1,823,448 | Hebbeler | Sept. 15, 1931 |
| 2,647,154 | Rupp et al. | July 28, 1953 |